United States Patent
Kawano et al.

(10) Patent No.: US 10,847,154 B2
(45) Date of Patent: Nov. 24, 2020

(54) INFORMATION PROCESSING DEVICE, INFORMATION PROCESSING METHOD, AND PROGRAM

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 124 days.

(21) Appl. No.: 16/095,052

(22) PCT Filed: Apr. 24, 2017

(86) PCT No.: PCT/JP2017/016152
§ 371 (c)(1),
(2) Date: Oct. 19, 2018

(87) PCT Pub. No.: WO2018/020763
PCT Pub. Date: Feb. 1, 2018

(65) Prior Publication Data
US 2019/0103110 A1    Apr. 4, 2019

(30) Foreign Application Priority Data
Jul. 26, 2016 (JP) ................. 2016-145967

(51) Int. Cl.
*G10L 15/22* (2006.01)
*G10L 25/63* (2013.01)
*G10L 15/02* (2006.01)
*G10L 15/32* (2013.01)
*G10L 15/187* (2013.01)

(52) U.S. Cl.
CPC .............. *G10L 15/22* (2013.01); *G10L 15/02* (2013.01); *G10L 15/187* (2013.01); *G10L 15/32* (2013.01); *G10L 25/63* (2013.01); *G10L 2015/025* (2013.01); *G10L 2015/226* (2013.01)

(58) Field of Classification Search
USPC ................................ 704/246, 247, 251–254
See application file for complete search history.

(56) References Cited

U.S. PATENT DOCUMENTS

| | | | | |
|---|---|---|---|---|
| 8,996,373 B2 * | 3/2015 | Hayakawa | .............. | G10L 17/04 704/2 |
| 2006/0122834 A1 * | 6/2006 | Bennett | .................. | G10L 15/30 704/256 |
| 2009/0313019 A1 * | 12/2009 | Kato | ...................... | G10L 17/26 704/254 |
| 2011/0004473 A1 * | 1/2011 | Laperdon | ................ | G10L 15/02 704/243 |
| 2011/0206198 A1 * | 8/2011 | Freedman | ............... | H04M 3/51 379/265.03 |

(Continued)

*Primary Examiner* — Leonard Saint Cyr
(74) *Attorney, Agent, or Firm* — Paratus Law Group, PLLC

(57) ABSTRACT

There is provided an information processing device, an information processing method, and a program which are capable of performing voice recognition adaptively to the degree of excitement in the sound collection state. The information processing device includes: an acquiring unit configured to acquire information indicating a degree of excitement in a collection state of a voice; and a voice recognizing unit configured to perform first voice recognition based on a phoneme of the voice on the basis of the information indicating the degree of excitement.

16 Claims, 11 Drawing Sheets

(56) References Cited

U.S. PATENT DOCUMENTS

2012/0166195 A1\* 6/2012 Hayakawa .............. G10L 17/26
704/240
2016/0027452 A1\* 1/2016 Kalinli-Akbacak .... G10L 25/63
704/240

\* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/016152 (filed on Apr. 24, 2017) under 35 U.S.C. § 371, which claims priority to Japanese Patent Application No. 2016-145967 (filed on Jul. 26, 2016), which are all hereby incorporated by reference in their entirety.

TECHNICAL FIELD

The present disclosure relates to an information processing device, an information processing method, and a program.

BACKGROUND ART

In the past, various techniques related to natural language processing have been proposed. For example, the following Patent Literature 1 discloses a technique for generating a sentence on the basis of phrases selected by a user among a plurality of phrases.

Further, various techniques related to voice recognition have also been proposed. In voice recognition, it is possible to convert the voice of a user who is speaking into character strings.

CITATION LIST

Patent Literature

Patent Literature 1: JP 2012-53634A

DISCLOSURE OF INVENTION

Technical Problem

However, in the technique of the related art, for example, the voice recognition is fixedly performed on collected voices regardless of a degree of excitement of the user in a sound collection state. For this reason, in the technique of the related art, a voice recognition result in which the degree of excitement is reflected is unable to be obtained.

In this regard, the present disclosure proposes an information processing device, an information processing method, and a program which are novel and improved and capable of performing voice recognition adaptively to the degree of excitement in the sound collection state.

Solution to Problem

According to the present disclosure, there is provided an information processing device, including: an acquiring unit configured to acquire information indicating a degree of excitement in a collection state of a voice; and a voice recognizing unit configured to perform first voice recognition based on a phoneme of the voice on the basis of the information indicating the degree of excitement.

In addition, according to the present disclosure, there is provided an information processing method, including: acquiring information indicating a degree of excitement in a collection state of a voice; and performing, by a processor, first voice recognition based on a phoneme of the voice on the basis of the information indicating the degree of excitement.

In addition, according to the present disclosure, there is provided a program for causing a computer to function as: an acquiring unit configured to acquire information indicating a degree of excitement in a collection state of a voice; and a voice recognizing unit configured to perform first voice recognition based on a phoneme of the voice on the basis of the information indicating the degree of excitement.

Advantageous Effects of Invention

As described above, according to the present disclosure, it is possible to perform the voice recognition adaptively to the degree of excitement in the sound collection state. Further, the effects described here are not necessarily limiting, and any effect described in the present disclosure may be included.

MODE(S) FOR CARRYING OUT THE INVENTION

Figure 1:
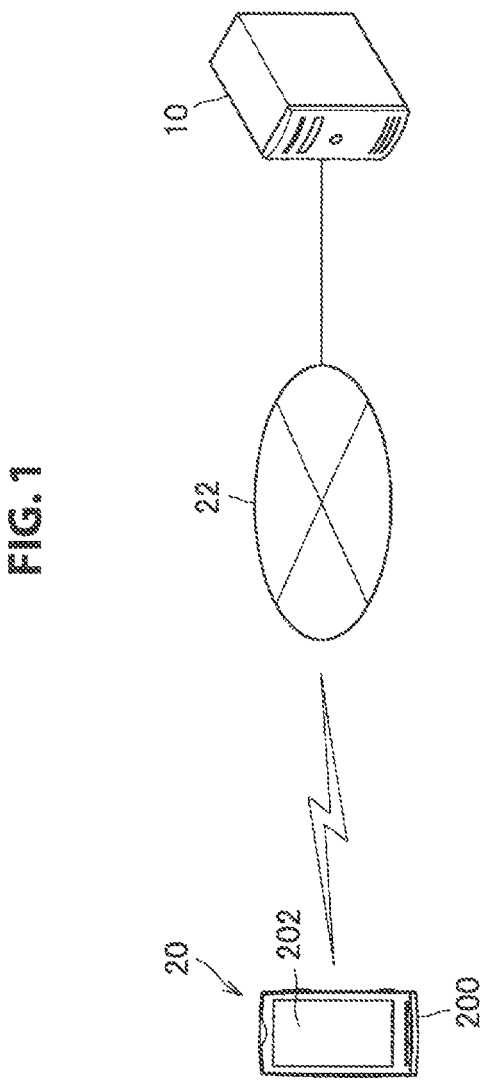
FIG. 1 is an explanatory diagram illustrating a configuration example of an information processing system according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are distinguished by attaching different letters after the same reference numerals. For example, a plurality of configurations having substantially the same functional configuration are distinguished like a server 10a and a server 10b if necessary. Here, in a case in which it is not necessary to particularly distinguish each of a plurality of constituent elements having substantially the same functional configuration, only the same reference numerals are attached. For example, in a case in which there is not necessary to particularly distinguish a server 10*a* and a server 10*b*, they are referred to simply as a server 10.

Further, a "mode for carrying out the invention" will be described in accordance with the order of items described below.
1. Configuration of information processing system
2. Detailed description of embodiment
3. Hardware configuration
4. Modified example

1. Configuration of Information Processing System

First, a configuration of the information processing system according to the present disclosure will be described with reference to FIG. 1. As illustrated in FIG. 1, the information processing system includes a server 10, a terminal 20, and a communication network 22.

1-1. Terminal 20

The terminal 20 is an information processing terminal used by the user. For example, the terminal 20 can collect a sound such as speech of the user or display a display screen.

As illustrated in FIG. 1, the terminal 20 includes, for example, a sound collecting unit 200 and a manipulating/display unit 202. The sound collecting unit 200 is, for example, a microphone. The sound collecting unit 200 detects an external sound (air vibration) and converts the detected sound into an electric signal.

The manipulating/display unit 202 includes a display unit for displaying the display screen and a manipulating unit for detecting a touch manipulation by the user. The display unit includes, for example, a liquid crystal display (LCD) device or an organic light emitting diode (OLED) device. Further, the manipulating unit includes, for example, a touch panel.

Further, the terminal 20 can communicate with other devices via the communication network 22 to be described later. For example, the terminal 20 transmits voice data collected by the sound collecting unit 200 to the server 10 via the communication network 22. Further, for example, the terminal 20 may collectively transmit the voice data at the time of single voice input to the server TO or may sequentially transmit only voices collected during a predetermined period of time to the server 10 (for example, in real time) at predetermined time intervals.

1-1-1. Modified Example

Further, although FIG. 1 illustrates an example in which the terminal 20 is a smartphone, the terminal 20 is not limited to this example. For example, the terminal 20 may be a general-purpose personal computer (PC), a tablet terminal, a game machine, a telephone other than a smartphone, a portable music player, a television receiver, a robot, or a wearable device such as a head mounted display (HMD), a headset, or a smart watch.

Further, the configuration of the terminal 20 is not limited to the example described above. For example, the terminal 20 may not include the manipulating/display unit 202. In this case, any other device (not illustrated) including the above-mentioned display unit and the above-mentioned manipulating unit may be connected to the communication network 22. Further, the display unit and the manipulating unit may be included in a single device or may be included in separate devices.

1-2. Server 10

The server 10 is an example of an information processing device in the present disclosure. The server 10 has a voice recognition function. For example, the server 10 can perform voice recognition (cloud voice recognition) on the voice data received from the terminal 20 via the communication network 22. Further, the server 10 can perform various kinds of language processing on a character string group obtained from a voice recognition result. Here, the character string group includes one or more character strings.

Further, the server 10 can determine one or more sets for the character string group on the basis of the language processing result for the character string group. Further, the server 10 can perform control such that one or more decided sets are displayed on the terminal 20. Here, the set includes one or more characters. For example, the set may include one or more words. More specifically, in a case in which the language is English, German, or the like, the set may include one or more words. Further, in a case in which the language is Japanese, the set can include one or more phrases.

1-3. Communication Network 22

The communication network 22 is a wired or wireless transmission path of information transmitted from a device connected to the communication network 22. Examples of the communication network 22 include a public line network such as a telephone network, the Internet, or a satellite communication network, various kinds of local area networks (LANs) including Ethernet (registered trademark), and a wide area network (WAN). Further, the communication network 22 may include a dedicated line network such as an Internet protocol-virtual private network (IP-VPN).

1-4. Description of Problems

The configuration of the information processing system by the present embodiment has been described above. Here, in order to clarify features of the present embodiment, a voice recognition method according to a comparative example of the present disclosure will be described. In the present comparative example, voice recognition is consistently performed on a collected voice using both an acoustic model and a language model. However, for example, in a case in which "shouting speech" is included in a voice of a recognition target, in the present comparative example, there is a problem in that erroneous recognition is likely to occur.

Figure 2:
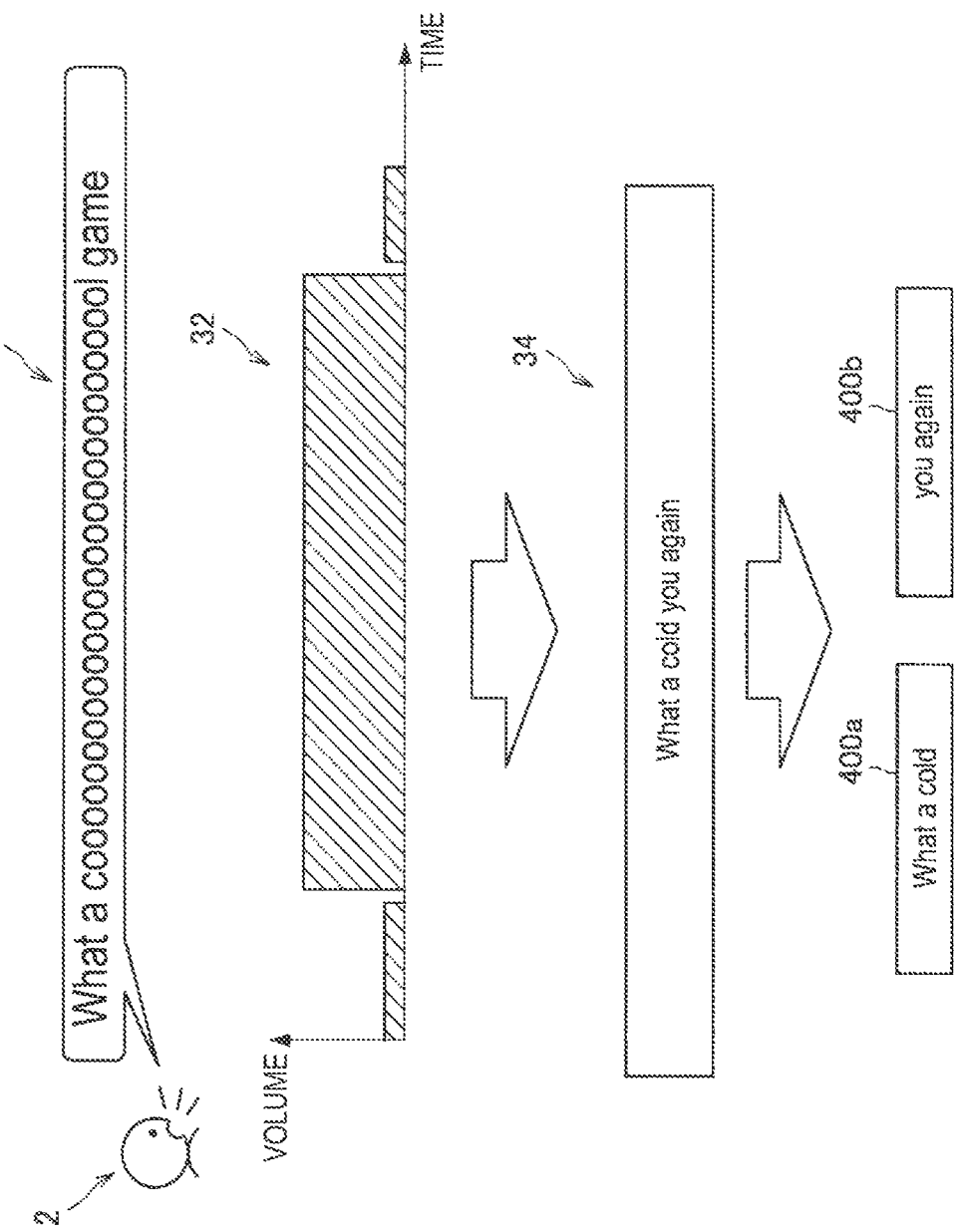
FIG. 2 is an explanatory diagram illustrating an example of voice recognition in accordance with a comparative example of the present disclosure.

Here, the above content will be described in more detail with reference to FIG. 2. FIG. 2 is an explanatory diagram illustrating a voice recognition example according to the present comparative example. In the example illustrated in FIG. 2, speech 30 "What a cooooooooooooooooooooooooooool game" is spoken by the user. The speech 30 is speech in which a volume temporarily increases as if the user were shouting in an interval corresponding to "cooooooooooooooooooooooooooool" as in a volume waveform 32 illustrated in FIG. 2. In this case, in the present comparative example, the voice recognition is performed on all voice data of the speech 30 using the acoustic model and the language model, and the voice data is converted into a character string group 34. In other words, in the present comparative example, the "shouting speech" is not distinguished from other speech, and the voice recognition is consistently performed using the acoustic model and the language model. As a result, as indicated in the character string group 34, particularly, the "shouting speech" and the voice immediately before or after the shouting may be erroneously recognized.

Further, in the present comparative example, the language processing is performed on the character string group 34, and two sets 400 are decided on the basis of the result of language processing. As illustrated in FIG. 2, both sets 400 contain an erroneously recognized character string. As a result, for example, in an application that edits character strings in units of sets, in a case in which the user desires to modify the character string group 34 as intended when speaking, the user has to delete both of the sets 400, and thus it takes much time and effort to correct.

In this regard, the server 10 according to the present embodiment was invented in light of the above circumstances. The server 10 according to the present embodiment acquires information indicating a degree of excitement in a collection state of a voice and performs first voice recognition based on phonemes of the voice or second voice recognition different from the first voice recognition on the basis of the information indicating the degree of excitement. Therefore, it is possible to dynamically change the voice recognition method in accordance with the degree of excitement of the user. For example, the voice recognition can be performed using different voice recognition methods between the "shouting speech" included in the collected voice data and other speech.

2. Detailed Description of Embodiment

2-1. Configuration

Figure 3:
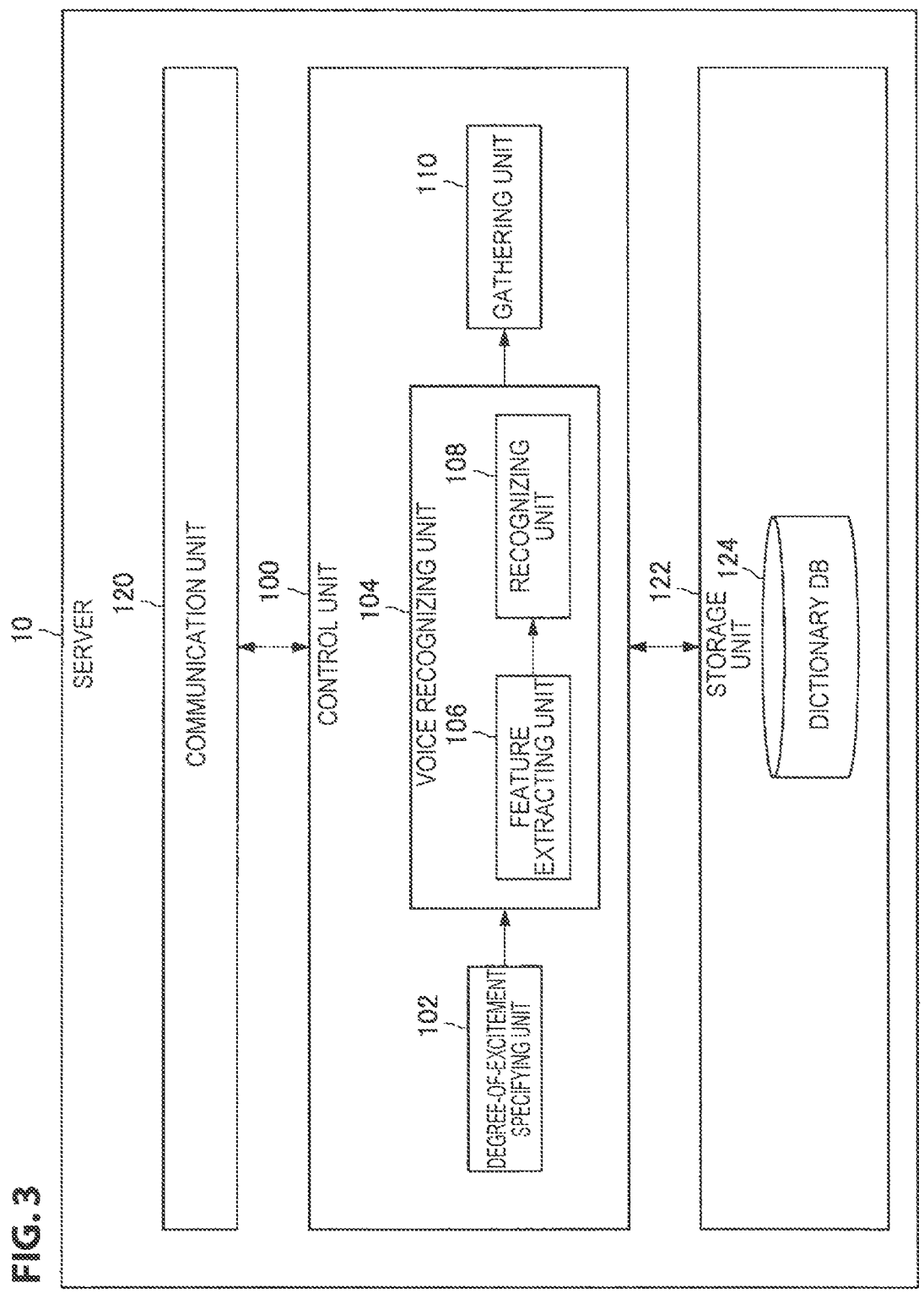
FIG. 3 is a functional block diagram illustrating a configuration example of a server 10 according to the embodiment.

Next, a configuration of the present embodiment will be described in detail. FIG. 3 is a functional block diagram illustrating a configuration example of the server 10 according to the present embodiment. As illustrated in FIG. 3, the server 10 includes a control unit 100, a communication unit 120, and a storage unit 122.

2-1-1. Control Unit 1001

The control unit 100 controls an operation of the server 10 in general using hardware such as a central processing unit (CPU) 150 (to be described later) or a random access memory (RAM) 154 (to be described later) which is installed in the server 10. Further, as illustrated in FIG. 3, the control unit 100 includes a degree-of-excitement specifying unit 102, a voice recognizing unit 104, and a gathering unit 110. Further, the voice recognizing unit 104 includes a feature extracting unit 106 and a recognizing unit 108.

2-1-2. Degree-of-Excitement Specifying Unit 102

The degree-of-excitement specifying unit 102 is an example of an acquiring unit in the present disclosure. For example, in a case in which the voice data is received from the terminal 20, the degree-of-excitement specifying unit 102 acquires the information indicating the degree of excitement in the sound collection state of the voice data. Here, the sound collection state of the voice data is basically a state in which the voice data is collected, but the sound collection state is not limited to this example, and a state immediately before or immediately after the voice data is collected may be used. Further, the voice data may include only a speech sound of the user who carries the terminal 20, may include only, for example, a speech sound of another user located near the user, or may include both the voice of the user and the voice of another user.

2-1-2-1. Volume

Here, the information indicating the degree of excitement may include attribute information (for example, a volume, a sound frequency, or the like) of the sound of the voice data. For example, the degree-of-excitement specifying unit 102 specifies the degree of excitement on the basis of detection of the volume of the sound. For example, the degree-of-excitement specifying unit 102 specifies the degree of excitement so that the degree of excitement increases as the detected volume of the sound increases.

2-1-2-2. Spike

Further, the information indicating the degree of excitement may include information indicating a degree of change in a volume or a pitch related to the voice data. For example, in a case in which it is detected that the volume or the pitch abruptly increases in a short time (that is, a spike is strong), the degree-of-excitement specifying unit 102 specifies that the degree of excitement is greater than a first threshold value, for example, only in the period.

2-1-2-3. Feature of Speech

Further, the information indicating the degree of excitement may include information related to a difference between a feature of a voice obtained from a learning result for previous speech of the user and a feature of the voice data. In this case, the data of the previous speech of the user may be accumulated in advance, and a feature of the sound of the speech of the user (for example, a feature related to a combination of a volume and a frequency characteristic of a sound) may be learned in advance. Then, the degree-of-excitement specifying unit 102 specifies the degree of excitement by comparing the feature of the voice data with the feature obtained from the learning result. For example, the degree-of-excitement specifying unit 102 specifies the degree of excitement such that the degree of excitement increases as an absolute value of a value indicating a difference between the feature of the voice data and the feature obtained from the learning result increases. In other words, in a case in which it is determined that corresponding speech is significantly different from usual speech of the user, the degree of excitement may be set to a value larger than a certain value.

2-1-2-4. Excitement of Another User

Further, the information indicating the degree of excitement may include information related to a state of a user different from the speaker of the corresponding voice. Here, the information related to the state of another user may include, for example, a detection result for a degree of excitement of another user in content (for example, a television program, a movie, a music, or the like) or a service (for example, a social networking service (SNS), an online game, or the like) being used by the speaker when the voice is collected. Further, for example, the degree of excitement of another user may be specified on the basis of a detection result for a facial expression of another user participating in a predetermined service (whether or not another user is laughing) or the number of users who are laughing, a detection result for a speaking situation of another user (whether or not a speech volume is larger than a predetermined threshold value, whether or not laughter is detected, or the like), or the like when the voice is collected. Alternatively, for example, the degree of excitement of another user may be specified on the basis of a result of semantic analysis on a sentence posted to an SNS by another user.

Further, the information related to the state of another user may include a detection result for excitement of another user located near the speaker (for example, in the same facility or in a predetermined outdoor area). In this case, for example, the degree of excitement of another user can be detected on the basis of a detection result for speech of another user or a result of image analysis on a facial expression of another user.

For example, the degree-of-excitement specifying unit 102 specifies the degree of excitement such that the degree of excitement increases as the detected degree of excitement of another user increases. Further, the speaker of the corresponding voice is an example of a first user in the present disclosure, and another user is an example of a second user in the present disclosure.

2-1-2-5. Biometric Information of Speaker

Further, the information indicating the degree of excitement may include biometric information of the speaker of the corresponding voice. Here, the biometric information may include, for example, a body temperature, a pulse rate, a respiration rate, blood pressure, an opening degree of the pupils (or eyes), brain waves, and/or a sweat rate. For example, the degree-of-excitement specifying unit 102 specifies the degree of excitement on the basis of a predetermined relation between the value indicated by the biometric information of the speaker and the degree of excitement. As an example, the degree-of-excitement specifying unit 102 specifies the degree of excitement such that the degree of excitement increases as the pulse rate or the blood pressure of the speaker increases. Further, the degree-of-excitement specifying unit 102 specifies the degree of excitement such that the degree of excitement increases as the opening degree of the pupils of the speaker increases.

2-1-2-6. Behavior Information of Speaker

Further, the information indicating the degree of excitement may include information related to a behavior situation of the speaker of the corresponding voice. For example, the information indicating the degree of excitement may include information indicating a manipulation state of a predetermined device (for example, the terminal 20, the game controller, or the like) by the speaker. For example, in a case in which it is detected that the speaker mashes, quickly moves, or greatly moves a game controller when speaking, the degree-of-excitement specifying unit 102 specifies that a degree of excitement is a value greater than the first threshold value.

2-1-2-7. Combination

Further, the degree-of-excitement specifying unit 102 can specify the degree of excitement on the basis of a combination of a plurality of types of information described above. For example, in a case in which the volume of the speech included in the voice data is low but it is specified that the degree of excitement is high from other types of information, the degree-of-excitement specifying unit 102 can specify that the degree of excitement is a value greater than the first threshold value.

2-1-3. Feature Extracting Unit 106

The feature extracting unit 106 analyzes the voice data received from the terminal 20 and extracts a predetermined feature quantity. For example, the feature extracting unit 106 extracts the feature quantity such as a mel-frequency cepstral coefficient (MFCC) by applying a Fourier transform, a discrete cosine transform, or the like to a voice signal included in the voice data.

2-1-4. Recognizing Unit 108

2-1-4-1. Recognition Example 1

The recognizing unit 108 recognizes the received voice data on the basis of the feature quantity extracted by the feature extracting unit 106 and the degree of excitement specified by the degree-of-excitement specifying unit 102. For example, the recognizing unit 108 compares the specified degree of excitement with the first threshold value and decides whether first voice recognition based on phonemes of the voice data or second voice recognition is performed on the voice data. As an example, in a case in which the degree of excitement is greater than the first threshold value, the recognizing unit 108 performs the first voice recognition on the voice data. Further, in a case in which the degree of excitement is less than or equal to the first threshold value, the recognizing unit 108 performs the second voice recognition on the voice data.

For example, in a case in which it is detected that the volume is temporarily higher than the first threshold value in a short period of time with respect to the voice data, and then the volume is less than or equal to the first threshold value, the recognizing unit 108 may perform the first voice recognition only on the voice corresponding to the short time among the voice data and perform the second voice recognition on the other voice data.

Here, the first voice recognition is, for example, voice recognition using the acoustic model without using the language model. Further, the second voice recognition may be voice recognition based on the phonemes of the voice data and a probability of an association of a plurality of character strings. For example, the second voice recognition is voice recognition using the acoustic model, the language model, and a dictionary DB 124. Here, the acoustic model is a model for modeling a sound as which a certain character string (such as a word) is likely to appear. For example, the acoustic model can be generated using a hidden Markov model or the like. Further, the language model is a model for modeling a probability of a plurality of character strings (word strings or the like) appearing in a specific language. For example, the language model can be generated using N-gram, context free grammar, or the like. Further, the dictionary DB 124 is a database in which a correspondence relation between the character string and a phoneme string is stored for each of a plurality of character strings (words, or the like). The dictionary DB 124 may be stored in, for example, the storage unit 122.

2-1-4-2. Recognition Example 2

Alternatively, the recognizing unit 108 can decide whether the first voice recognition or the second voice recognition is performed on the voice data on the basis of a length of a duration in which the degree of excitement is greater than the first threshold value. For example, the recognizing unit 108 determines whether the first voice recognition or the second voice recognition is performed on the voice data on the basis of a comparison between the length of the duration and a second threshold value. As an example, in a case in which the length of the duration is larger than the second threshold value, the recognizing unit 108 performs the first voice recognition on a first voice corresponding to the duration among the voice data and performs the second voice recognition on the voices other than the first voice. Further, in a case in which the length of the duration is equal to or less than the second threshold value, the recognizing unit 108 performs the second voice recognition on all voice data.

SPECIFIC EXAMPLE

Figure 4:
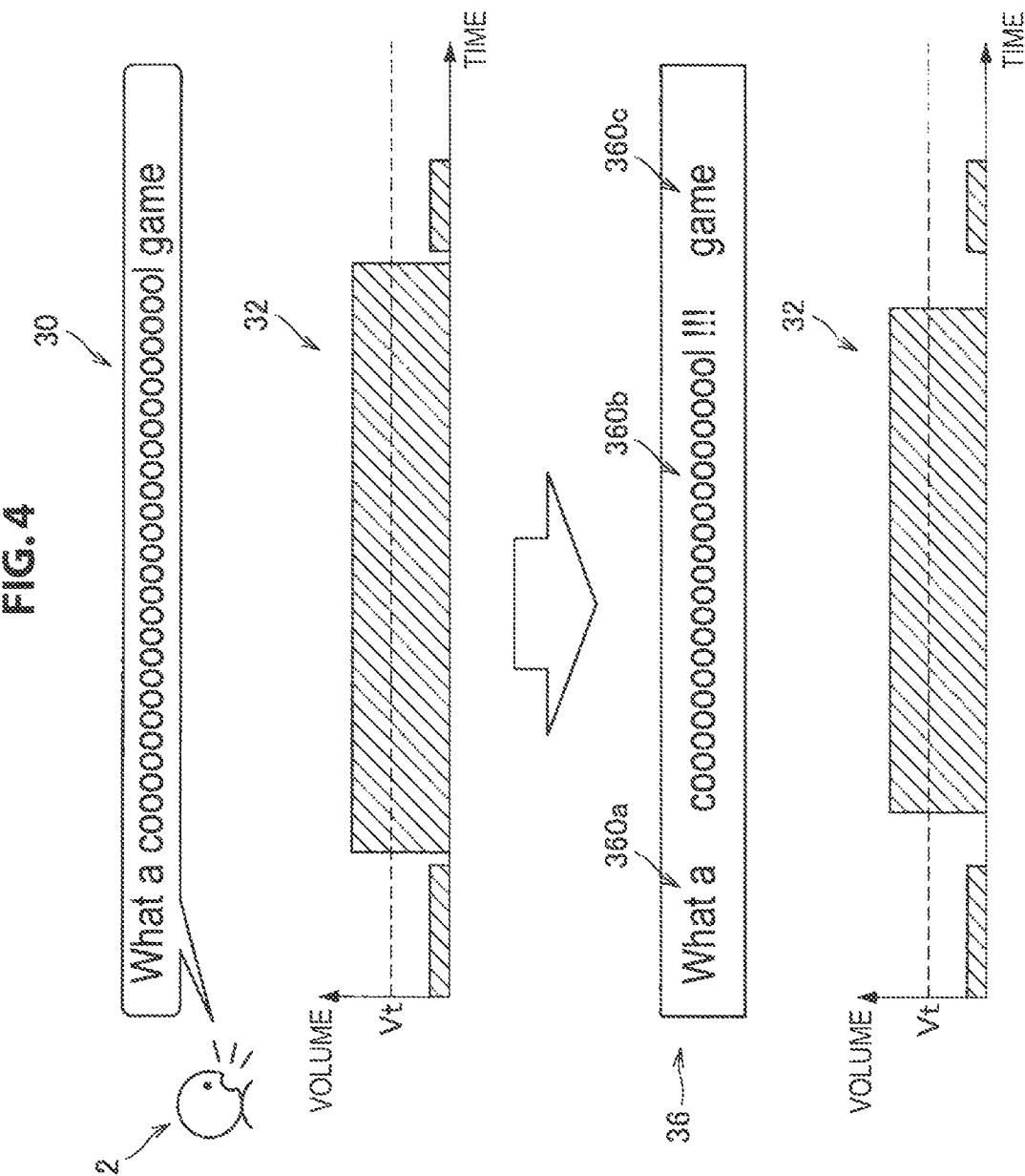
FIG. 4 is an explanatory diagram illustrating an example of voice recognition according to the embodiment.

Here, the above functions will be described in further detail with reference to FIG. 4. FIG. 4 is an explanatory diagram illustrating an example of the voice recognition by the recognizing unit 108 on the voice data of the speech 30 illustrated in FIG. 2. As illustrated in FIG. 4, a volume of the voice corresponding to "cooooooooooooooooooooooooooool" (hereinafter referred to as a "voice A") among the voice data of the speech 30 is assumed to be larger than a first threshold value Vt, and a volume of the voice other than the voice A is assumed to be equal to or less than Vt. Further, a length of a period of time corresponding to the voice A is assumed to be larger than the second threshold value.

In this case, the recognizing unit 108 performs the first voice recognition on the voice A. Specifically, the recognizing unit 108 first acquires a character string of a recognition result on the basis of a phoneme detection result for the voice A. As illustrated in FIG. 4, the character string includes, for example, a character string in which "os" which correspond in number to phonemes corresponding to the length of the period of time in which phonemes corresponding to "o" continues are arranged consecutively. Further, the recognizing unit 108 obtains a character string group 360b by adding, for example, one or more predetermined characters such as "!" to the end of the character string of the recognition result.

Further, the recognizing unit 108 performs the second voice recognition on the voices other than the voice A (that is, the voice corresponding to "What a" or "game") among the received voices, and converts the voices into a character string group 360a and a character string group 360c. According to this recognition method, for example, it is possible to perform the voice recognition while distinguishing the "screaming speech" from other speeches, and thus it is possible to reduce the erroneous recognition.

2-1-4-3. Recognition Example 3

Alternatively, the recognizing unit 108 can decide whether the first voice recognition or the second voice recognition is performed on the voice data on the basis of a result of comparison between the degree of excitement and the first threshold value and a length of a period of time in which the same phoneme is continued for the voice data. For example, the recognizing unit 108 decides whether the first voice recognition or the second voice recognition is performed on the voice data on the basis of a comparison between the second threshold value and the length of the period of time in which the same phoneme is continued in the period in which the degree of excitement is greater than the first threshold value.

As an example, in a case in which the length of the period of time in which the same phoneme is continued in the period in which the degree of excitement is greater than the first threshold value is larger than the second threshold value, the recognizing unit 108 performs the first voice recognition on a third voice corresponding to the period of time in which the same phoneme is continued among the voice data and performs the second voice recognition on the voices other than the third voice. For example, in a case in which the language is English, German, or the like, the recognizing unit 108 outputs a character string in which characters corresponding to the phonemes are consecutively arranged by the number of phonemes corresponding to the length of the period of time in which the same phoneme is continued as a part of the result of the first voice recognition. Further, in a case in which the language is Japanese, the recognizing unit 108 outputs the character string in which a character "-" is consecutively arranged by the number of phonemes corresponding to the length of the period of time in which the same phoneme is continued as a part of the result of the first voice recognition.

Further, in a case in which the length of the period of time in which the same phoneme is continued in the period in which the degree of excitement is greater than the first threshold value is equal to or less than the second threshold value, the recognizing unit 108 may perform the second voice recognition on the entire voice data.

2-1-5. Gathering Unit 110

The gathering unit 110 decides one or more sets on the basis of the character string group obtained from the recognition result by the recognizing unit 108. For example, the gathering unit 110 may decide a plurality of sets such that a character string group corresponding to the result of the first voice recognition and a character string group corresponding to the result of the second voice recognition are included in separate sets.

As an example, the gathering unit 110 decides the character string group corresponding to each result of the first voice recognition as one set. Further, the gathering unit 110 decides one or more sets on the basis of a predetermined setting criterion for the character string group corresponding to the result of the second voice recognition. Here, the predetermined setting criterion may be, for example, a constraint condition related to the number of words included in one set (for example, the number of words is 5 or less or the like) or may be a constraint condition related to the number of characters included in one set (for example, 30 or less characters).

Figure 5:
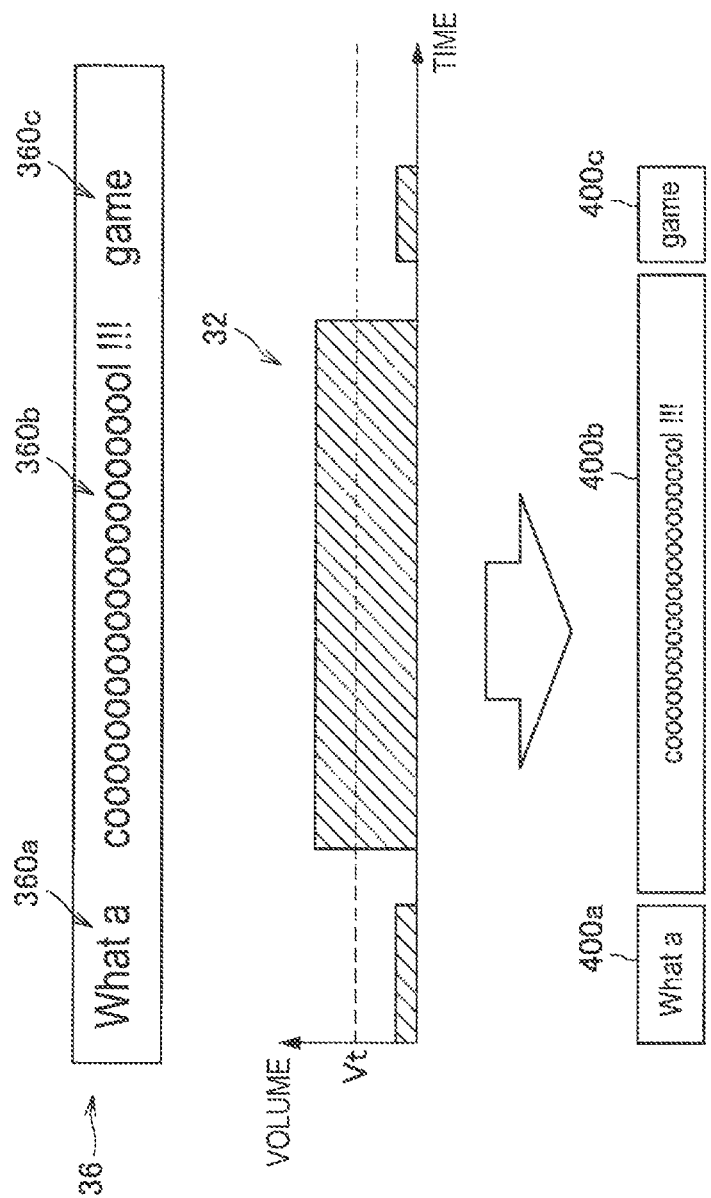
FIG. 5 is an explanatory diagram illustrating a set decision example according to the embodiment.

Here, the above functions will be described in further detail with reference to FIG. 5. FIG. 5 is an explanatory diagram illustrating an example in which a plurality of sets 400 are decided on the basis of the character string group 36 illustrated in FIG. 4. As illustrated in FIG. 5, the gathering unit 110 decides the character string group 360b obtained from the result of the first voice recognition as one set 400b. Further, the gathering unit 110 decides a set 400a and a set 400c on the basis of a predetermined setting criterion for the character string group 360a and the character string group 360c obtained from the result of the second voice recognition.

2-1-6. Communication Unit 120

The communication unit 120 performs transmission and reception of information with other devices via, for example, the communication network 22. For example, the communication unit 120 receives the voice data from the terminal 20. Further, the communication unit 120 transmits control information for displaying one or more sets decided by the gathering unit 110 to the terminal 20, under the control of the control unit 100.

2-1-7. Storage Unit 122

The storage unit 122 stores various kinds of data and various kinds of software. For example, the storage unit 122 stores the dictionary DB 124.

2-2. Flow of Process

The configuration of the present embodiment has been described above. Next, a flow of a process according to the present embodiment will be described with reference to FIGS. 6 to 10. Further, the following description will proceed with an example of a flow of a process in a situation in which the user inputs a character string group to the terminal 20 by voice will be described below. Further, the following description will proceed with an example in which the "information indicating the degree of excitement" is a volume. Further, the following description will proceed with an example in which the terminal 20 collectively transmits the voice data at the time of single voice input to the server 10.

2-2-1. Overall Flow

Figure 6:
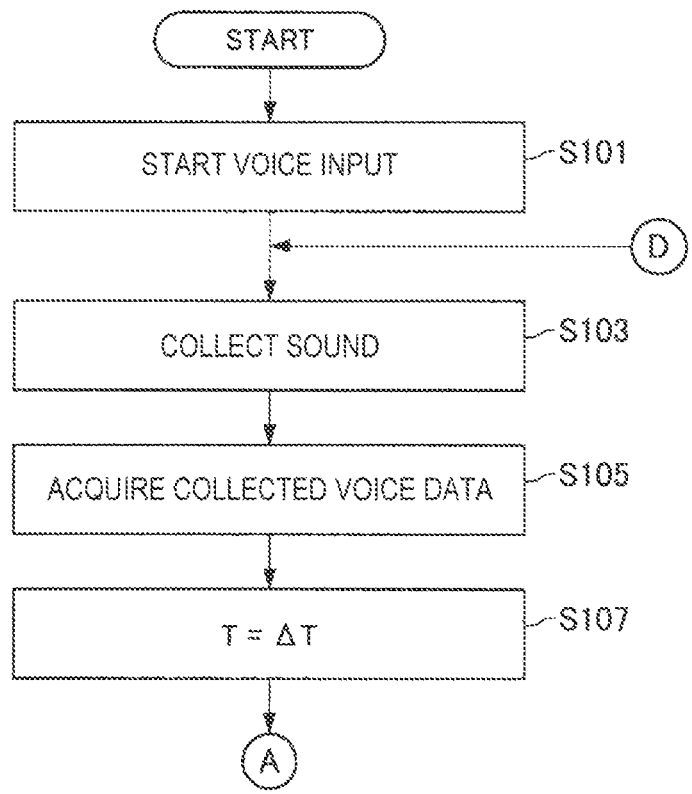
FIG. 6 is a flowchart illustrating a part of a process flow according to the embodiment.

FIG. 6 is a flowchart illustrating a part of an example of a process flow according to the present embodiment. As illustrated in FIG. 6, for example, the terminal 20 activates a voice input application on the basis of a predetermined manipulation on the terminal 20 by the user (S101). Then, the user speaks toward the terminal 20, and the sound collecting unit 200 collects the sound of the speech (S103).

Then, the terminal 20 transmits the collected voice data to the server 10 (S105).

Thereafter, the voice recognizing unit 104 of the server 10 sets a very short time ΔT as an analysis target period T (S107).

Figure 7:
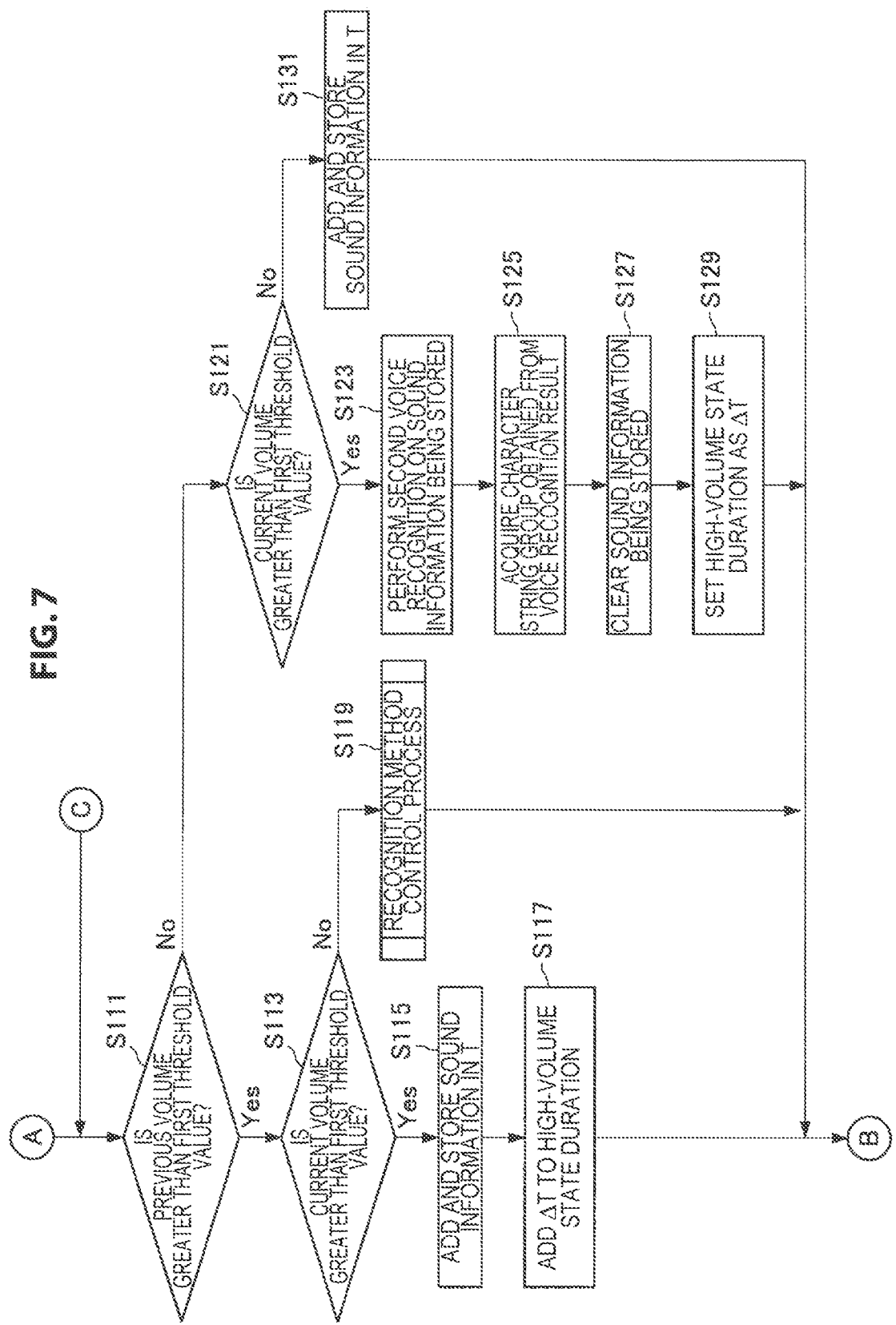
FIG. 7 is a flowchart illustrating a part of a process flow according to the embodiment.

Here, a flow of a process after S107 will be described with reference to FIG. 7. As illustrated in FIG. 7, after S107, the voice recognizing unit 104 determines whether or not a previously detected volume (that is, in a period of T−ΔT) is larger than the first threshold value for the voice data received in S105 (S111). Further, in a first determination, the voice recognizing unit 104 may determine that the previous volume is less than or equal to the first threshold value.

In a case in which it is determined that the previous volume is larger than the first threshold value (Yes in S111), the voice recognizing unit 104 then determines whether or not a currently detected volume (that is, in the period T) larger than the first threshold value (S113). In a case in which it is determined that the current volume is larger than the first threshold value for the voice data (Yes in S113), the voice recognizing unit 104 adds sound information in the period T to sound information being currently stored and stores resulting sound information (S115). Further, in an initial state, it is assumed that sound information is not stored at all.

Then, the voice recognizing unit 104 adds ΔT to a "duration in which the volume is larger than the first threshold value" being currently stored (hereinafter referred to as a "high-volume state duration") (S117). Further, in the initial state, "0 seconds" is assumed to be set as the high-volume state duration, Thereafter, the server 10 performs a process of S141 to be described later.

On the other hand, in a case in which it is determined that the current volume is equal to or less than the first threshold value (No in S113), the voice recognizing unit 104 performs a "recognition method control process" to be described later (S119). Thereafter, the server 10 performs the process of S141 described later.

Further, in a case in which it is determined in S111 that the previous volume is equal to or less than the first threshold value (No in S111), the voice recognizing unit 104 then determines whether or not the currently detected volume is larger than the first threshold value for the voice data (S121). In a case in which it is determined that the current volume is larger than the first threshold value (Yes in S121), the voice recognizing unit 104 performs the second voice recognition on the sound information being currently stored (S123). Then, the voice recognizing unit 104 acquires the character string group obtained from the recognition result in S123 (S125). Then, the voice recognizing unit 104 clears the sound information being currently stored (S127). Then, the voice recognizing unit 104 sets the high-volume state duration as ΔT (S129). Thereafter, the server 10 performs the process of S141 described later.

On the other hand, in a case in which it is determined that the current volume is equal to or less than the first threshold value (No in S121), the voice recognizing unit 104 adds and stores the sound information in the period T to the sound information being currently stored (S131). Thereafter, the server 10 performs the process of S141 described later.

Figure 8:
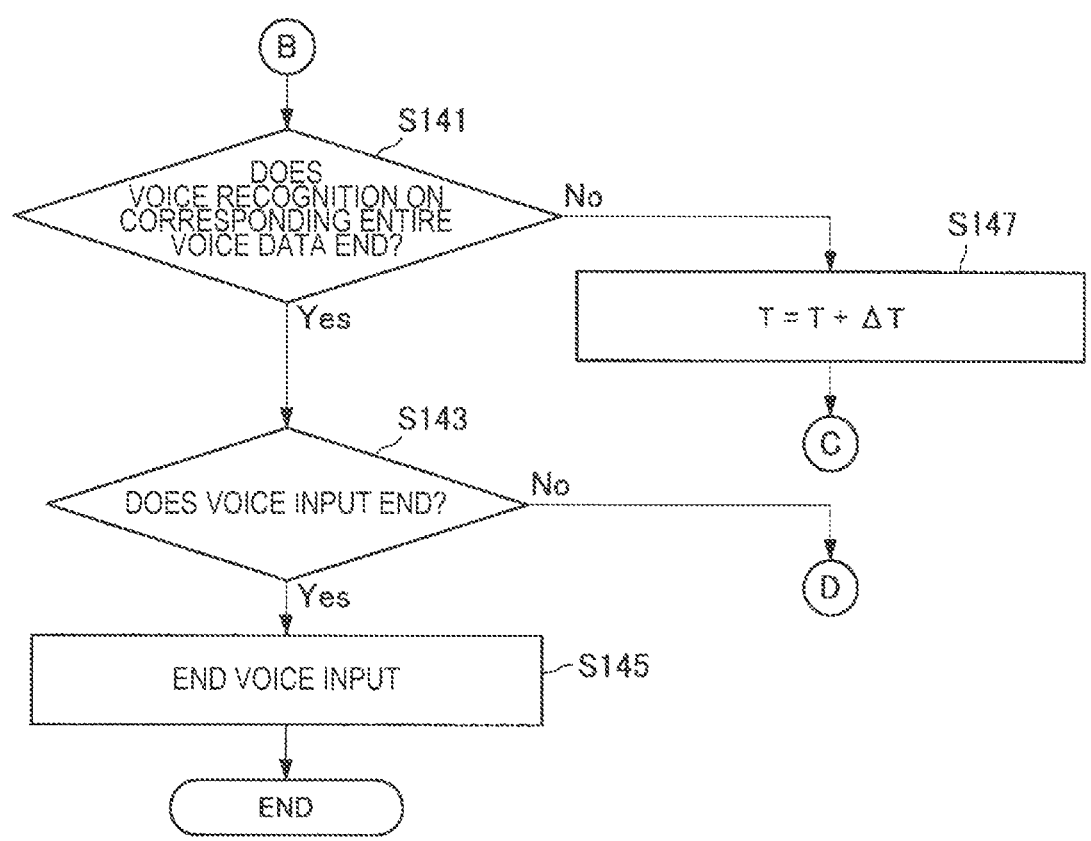
FIG. 8 is a flowchart illustrating a part of a process flow according to the embodiment.

Here, a flow of a process after S141 will be described with reference to FIG. 8. As illustrated in FIG. 8, the voice recognizing unit 104 determines whether or not the voice recognition for the entire voice data ends (S141). In a case in which the voice recognition for the entire voice data does not end (No in S141), the voice recognizing unit 104 adds ΔT to T (S147). Thereafter, the voice recognizing unit 104 performs the process starting from S111 again.

On the other hand, in a case in which the voice recognition for the entire voice data ends (Yes in S141), and a manipulation to end the voice input is performed by the user (Yes in S143), the terminal 20 ends the voice input application (S145). Further, the present process ends.

On the other hand, in a case in which the manipulation to end the voice input is not performed (No in S143), the process starting from S103 is performed again.

2-2-2. Recognition Method Control Process

Figure 9:
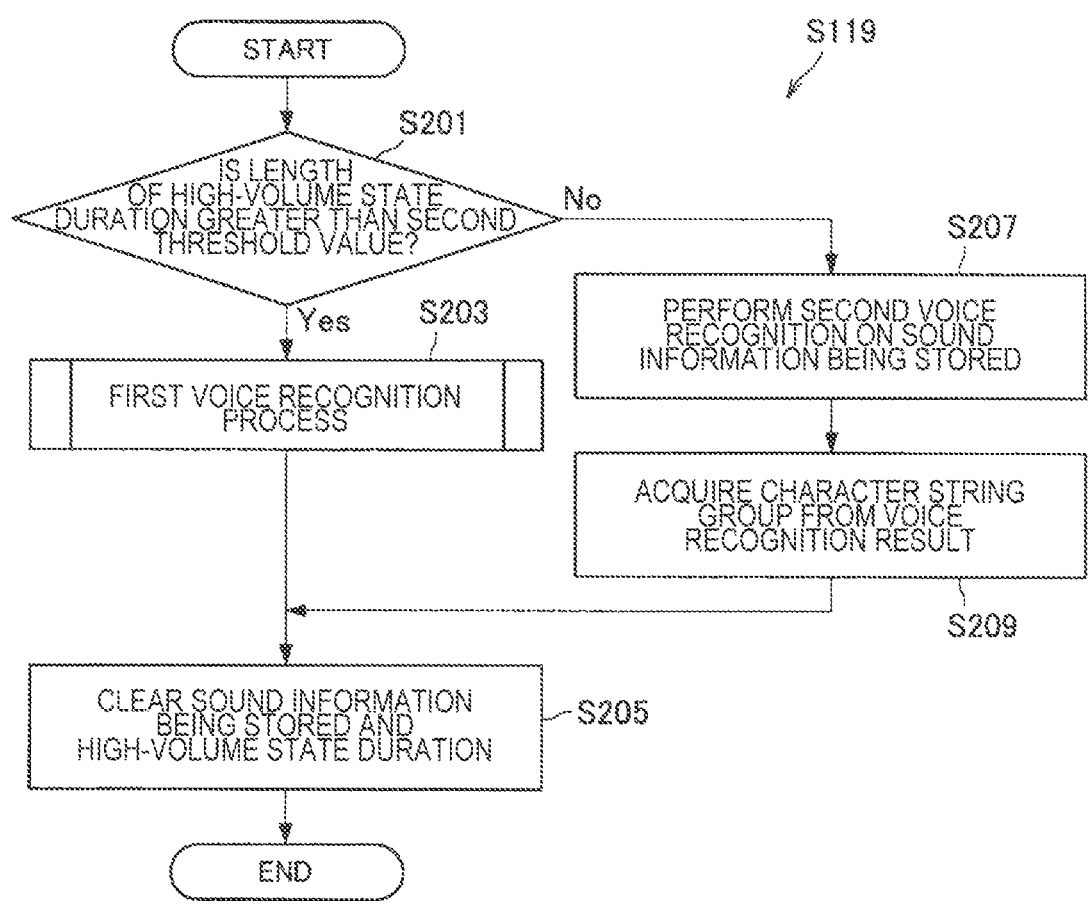
FIG. 9 is a flowchart illustrating a flow of a "recognition method control process" according to the embodiment.

Next, a flow of the "recognition method control process" in S119 will be described with reference to FIG. 9. As illustrated in FIG. 9, first, the voice recognizing unit 104 determines whether or not the length of the high-volume state duration currently being stored is larger than a second threshold value (S201). In a case in which the length of the high-volume state duration is larger than the second threshold value (Yes in S201), the voice recognizing unit 104 performs a "first voice recognition process" to be described later (S203). Thereafter, the voice recognizing unit 104 clears the sound information being currently stored and the "high volume state duration" currently stored (S205).

On the other hand, in a case in which the length of the high-volume state duration is equal to or less than the second threshold value (No in S201), the voice recognizing unit 104 performs the second voice recognition on the sound information being currently stored (S207). Then, the voice recognizing unit 104 acquires the character string group obtained from the recognition result in S207 (S209). Thereafter, the voice recognizing unit 104 performs the process of S205.

2-2-1 First Voice Recognition Process

Figure 10:
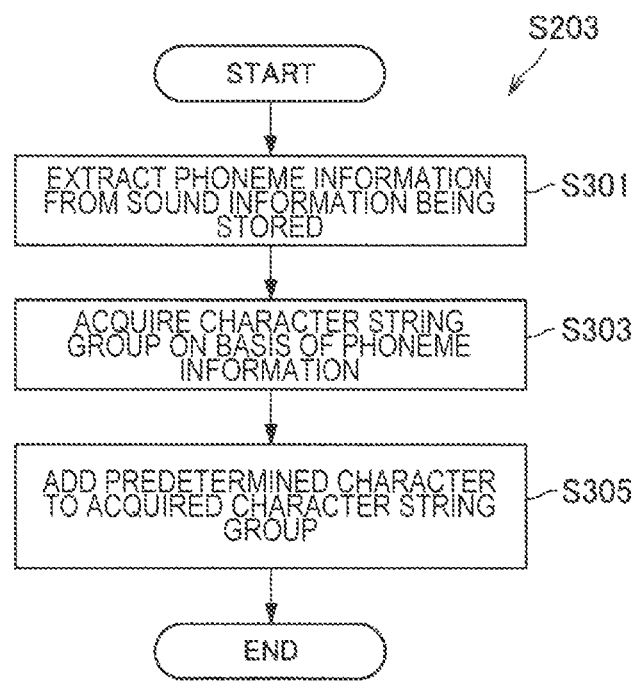
FIG. 10 is a flowchart illustrating a flow of a "first voice recognition process" according to the embodiment.

Next, a flow of the "first voice recognition process" in S203 will be described with reference to FIG. 10. As illustrated in FIG. 10, first, the voice recognizing unit 104 extracts phoneme information from the sound information being currently stored (S301). Then, the voice recognizing unit 104 specifies the character string group on the basis of the extracted phoneme information, and acquires the character string group (S303). Thereafter, the voice recognizing unit 104 adds one or more predetermined characters such as "!" to the acquired character string group (S305).

2-3. Effects

2-3-1. Effect 1

As described above, according to the present embodiment, the server 10 acquires the information indicating the degree of excitement in the collection state of the voice, and performs the first voice recognition or the second voice recognition on the basis of the information indicating the degree of excitement. For this reason, for example, the voice recognition method can be changed dynamically in accordance with the degree of excitement of the speaker or another user at the time of sound collection.

For example, in a case in which the length of the duration for which the volume is larger than the first threshold value is larger than the second threshold value for the voice, the server 10 performs the first voice recognition (that is, the voice recognition in which the language model is not used) on the voice corresponding to the duration among the voices and performs the second voice recognition (that is, the voice recognition in which the language model is used) on the other voices. For this reason, the voice recognition can be performed while distinguishing, for example, the "shouting speech" included in the voice from other speeches, and thus the erroneous recognition can be reduced as compared with, for example, the comparative example of the present disclosure.

Further, since the voice recognition is performed on the "screaming speech" using only the acoustic model, even when the erroneous recognition is performed, a character string group in which the ambience of speech is transferred is obtained as a result of voice recognition.

2-3-2. Effect 2

Further, for example, in a case in which the volume of the voice is small, but it is specified that the degree of excitement of the user is high, the server 10 performs the first voice recognition on the collected voice data. Therefore, in a case in which it is specified that the degree of excitement of the user (or another user) is high at the time of sound collection even in, for example, a situation in which the user hesitates to give a loud voice, the server 10 can convert the voice data into a character string group indicating that the degree of excitement is high (or a feeling is strong). Thus, for example, a more appropriate voice recognition result is obtained as compared with the comparative example of the present disclosure.

2-3-3. Effect 3

Further, the server 10 can decide each character string group corresponding to each result of the first voice recognition as one set. Accordingly, for example, a plurality of sets can be determined so that, for example, the recognition result of the "shouting speech" and the recognition result of other speeches are included in separate sets, respectively. As a result, for example, in an application that edits the character string in units of sets, it is easy for the user to modify the character string, and thus the convenience is high, for example, in a case in which the voice recognition result includes an error.

3. Hardware Configuration

Figure 11:
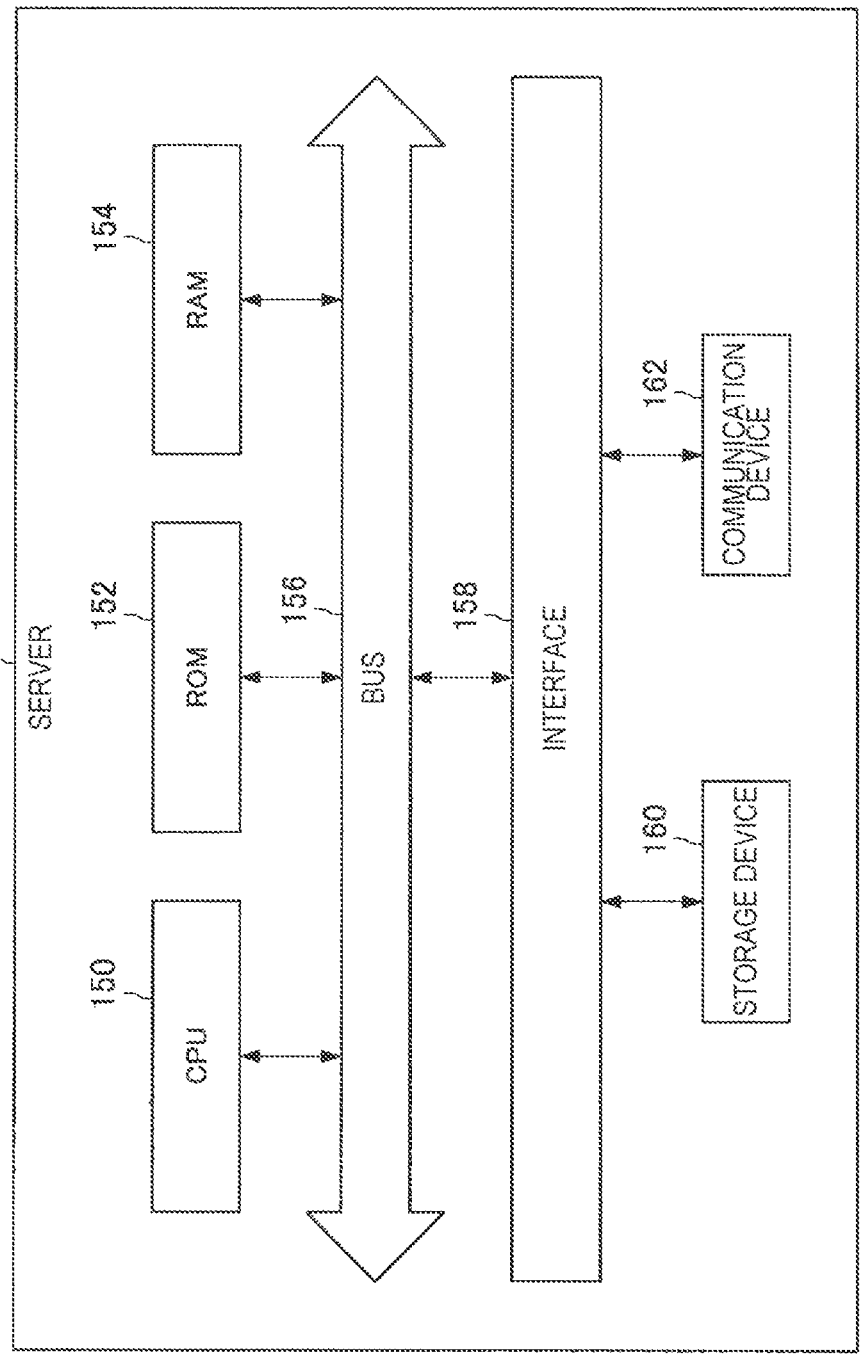
FIG. 11 is an explanatory diagram illustrating a hardware configuration example of the server 10 according to the embodiment.

Next, a hardware configuration of the server 10 according to the present embodiment will be described with reference to FIG. 11. As illustrated in FIG. 11, the server 10 includes a CPU 150, a read only memory (ROM) 152, a RAM 154, a bus 156, an interface 158, a storage device 160, and a communication device 162.

The CPU 150 functions as an arithmetic processing device and a control device and controls an overall operation of the server 10 according to various kinds of programs. Further, the CPU 150 realizes the function of the control unit 100 in the server 10. Further, the CPU 150 is constituted by a processor such as a microprocessor.

The ROM 152 stores, for example, control data such as a program, an operation parameter, and the like used by the CPU 150.

The RAM 154 temporarily stores, for example, a program executed by the CPU 150.

The bus 156 is constituted by a CPU bus or the like. The bus 156 connects the CPU 150, the ROM 152, and the RAM 154 to one another.

The interface 158 connects the storage device 160 and the communication device 162 with the bus 156.

The storage device 160 is a data storage device functioning as the storage unit 122. The storage device 160 includes, for example, a storage medium, a recording device for recording data in a storage medium, a reading device for reading data from a storage medium, a deletion device for deleting data recorded in a storage medium, and the like.

The communication device 162 is a communication interface constituted by a communication device or the like for establishing a connection with, for example, a communication network 22 or the like. Further, the communication device 162 may be a communication device that supports a wireless LAN, a communication device that supports Long Term Evolution (LTE), or a wire communication device that performs communication in a wired manner. This communication device 162 functions as the communication unit 120.

4. Modified Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

4-1. Modified Example 1

For example, in the example illustrated in FIG. 4, the example in which the server 10 (the recognizing unit 108)

adds a predetermined character ("!" or the like) to an end of a character string (that is, the character string group 360*b*) corresponding to the result of the first voice recognition has been described, but the present disclosure is not limited to such an example. For example, the recognizing unit 108 may add a predetermined character to an end of a corresponding sentence (in the example illustrated in FIG. 4, the end of the character string group 360*c*). Alternatively, the recognizing unit 108 may add a character such as a double quotation mark or a single quotation mark (as a predetermined character) before and after the character string corresponding to the result of the first voice recognition.

Alternatively, instead of adding a predetermined character, the server 10 may cause a font of the character string corresponding to the result of the first voice recognition to be different from a standard font. For example, the server 10 may cause the character string to be bold, cause a display color of the character string to be changed, or add an underline to the character string. Alternatively, instead of adding a predetermined character, the server 10 may add a predetermined image.

4-2. Modified Example 2

Further, the configuration of the information processing system according to the present embodiment is not limited to the example illustrated in FIG. 1. For example, although only one server 10 is illustrated in FIG. 1, the present disclosure is not limited to this example, and a plurality of computers may cooperatively operate to implement the above-described functions of the server 10. Further, although only one terminal 20 is illustrated in FIG. 1, the present disclosure is not limited to this example, and the information processing system may include a plurality of terminals 20.

4-3. Modified Example 3

Further, the configuration of the server 10 according to the present embodiment is not limited to the example illustrated in FIG. 3. For example, the gathering unit 110 may not be included in the server 10 but may be included in another device capable of communicating with the server 10 such as the terminal 20.

4-4. Modified Example 4

Further, in the above embodiment, the example in which the information processing device in the present disclosure is the server 10 has been described, but the present disclosure is not limited to such an example. For example, in a case in which the terminal 20 has at least the functions of the degree-of-excitement specifying unit 102 and the voice recognizing unit 104, the information processing device may be the terminal 20.

Alternatively, the terminal 20 may include all the constituent elements included in the control unit 100 described above. In this case, the server 10 need not be necessarily installed.

4-5. Modified Example 5

Further, steps in the flow of the process illustrated in FIGS. 6 to 10 need not be necessarily processed in the described order. For example, steps may be processed in a properly changed order. Further, steps may not be processed chronologically but may be processed in parallel or individually. Further, some of steps described may be omitted, or another step may be added.

Further, according to the above embodiment, it is also possible to provide a computer program causing hardware such as the CPU 150, the ROM 152, the RAM 154, and the like to perform the same functions as the components of the server 10 according to the above-described embodiment. Further, a storage medium in which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

an acquiring unit configured to acquire information indicating a degree of excitement in a collection state of a voice; and a voice recognizing unit configured to perform first voice recognition based on a phoneme of the voice on the basis of the information indicating the degree of excitement.

(2)

The information processing device according to (1), in which the voice recognizing unit performs the first voice recognition on the basis of a comparison between the degree of excitement and a first threshold value.

(3)

The information processing device according to (2), in which, in a case in which the degree of excitement is greater than the first threshold value, the voice recognizing unit performs the first voice recognition on the voice, and in a case in which the degree of excitement is equal to or less than the first threshold value, the voice recognizing unit performs second voice recognition different from the first voice recognition on the voice.

(4)

The information processing device according to (2) or (3), in which the voice recognizing unit performs the first voice recognition on the basis of a length of a duration in which the degree of excitement is greater than the first threshold value.

(5)

The information processing device according to (4), in which the voice recognizing unit performs the first voice recognition on the basis of a comparison between the length of the duration and a second threshold value.

(6)

The information processing device according to (5), in which, in a case in which the length of the duration is greater than the second threshold value, the voice recognizing unit performs the first voice recognition based on a phoneme of a first voice corresponding the duration among the voices on the first voice, and the voice recognizing unit performs second voice recognition different from the first voice recognition on a second voice other than the first voice among the voices.

(7)

The information processing device according to (6), in which the voice recognizing unit performs the second voice recognition on the voice in a case in which the length of the duration is equal to or less than the second threshold value.

(8)

The information processing device according to any one of (1) to (3), in which the acquiring unit further acquires information indicating a length of a period of time in which a same phoneme specified from the voice is continued, and the voice recognizing unit further performs the first voice recognition on the basis of the length of the period of time in which the same phoneme is continued.

(9)

The information processing device according to (8), in which the voice recognizing unit performs the first voice recognition on the basis of a comparison between the degree of excitement and a first threshold value and a comparison between the length of the period of time in which the same phoneme is continued and a second threshold value.

(10)

The information processing device according to (9), in which the voice recognizing unit performs the first voice recognition or second voice recognition different from the first voice recognition on the basis of whether or not the length of the period of time in which the same phoneme is continued is larger than the second threshold value while the degree of excitement is greater than the first threshold value.

(11)

The information processing device according to any one of (1) to (10), in which the information indicating the degree of excitement includes a volume of the voice.

(12)

The information processing device according to any one of (1) (11), in which the information indicating the degree of excitement includes information related to a difference between a feature of the voice and a feature of a voice obtained from a learning result of speech of a first user who speaks the voice.

(13)

The information processing device according to any one of (1) to (12), in which the information indicating the degree of excitement includes information related to a state of a second user different from a first user who speaks the voice.

(14)

The information processing device according to any one of (1) to (13), in which the information indicating the degree of excitement includes biometric information of a first user who speaks the voice.

(15)

The information processing device according to any one of (1) to (14), in which the information indicating the degree of excitement includes information related to a behavior situation of a first user who speaks the voice.

(16)

The information processing device according to (15), in which the information related to the behavior situation of the first user includes a manipulation state of a predetermined device by the first user.

(17)

The information processing device according to (3) or (6), in which the second voice recognition is voice recognition based on a phoneme of a voice of a recognition target and a probability related to an association of a plurality of character strings.

(18)

The information processing device according to (17), in which the first voice recognition is voice recognition in which a language model is not used, and the second voice recognition is voice recognition in Which the language model is used.

(19)

An information processing method, including:

acquiring information indicating a degree of excitement in a collection state of a voice; and performing, by a processor, first voice recognition based on a phoneme of the voice on the basis of the information indicating the degree of excitement.

(20)

A program for causing a computer to function as:

an acquiring unit configured to acquire information indicating a degree of excitement in a collection state of a voice; and a voice recognizing unit configured to perform first voice recognition based on a phoneme of the voice on the basis of the information indicating the degree of excitement.

REFERENCE SIGNS LIST

10 server
20 terminal
22 communication network
100 control unit
102 degree-of-excitement specifying unit
104 voice recognizing unit
106 feature extracting unit
108 recognizing unit
110 gathering unit
120 communication unit
122 storage unit
124 dictionary DB
200 sound collecting unit
202 manipulating/display unit

The invention claimed is:

1. An information processing device, comprising:
    an acquiring unit configured to acquire information indicating a degree of excitement in a collection state of a voice; and
    a voice recognizing unit configured to perform first voice recognition based on a phoneme of the voice on a basis of the information indicating the degree of excitement;
    wherein the voice recognizing unit performs the first voice recognition on a basis of a length of a duration in which the degree of excitement is greater than the first threshold value;
    wherein the voice recognizing unit performs the first voice recognition on a basis of a comparison between the length of the duration and a second threshold value;
    wherein, in a case in which the length of the duration is greater than the second threshold value, the voice recognizing unit performs the first voice recognition based on a phoneme of a first voice corresponding to the duration among the voices on the first voice,
    wherein the voice recognizing unit performs second voice recognition different from the first voice recognition on a second voice other than the first voice among the voices; and
    wherein one or more of the acquiring unit and the voice recognition unit is implemented, at least in part, by one or more hardware elements of the device.

2. The information processing device according to claim 1, wherein, in a case in which the degree of excitement is greater than the first threshold value, the voice recognizing unit performs the first voice recognition on the voice, and
    in a case in which the degree of excitement is equal to or less than the first threshold value, the voice recognizing unit performs second voice recognition different from the first voice recognition on the voice.

3. The information processing device according to claim 2, wherein the second voice recognition is voice recognition based on a phoneme of a voice of a recognition target and a probability related to an association of a plurality of character strings.

4. The information processing device according to claim 3, wherein the first voice recognition is voice recognition in which a language model is not used, and
the second voice recognition is voice recognition in which the language model is used.

5. The information processing device according to claim 1, wherein the voice recognizing unit performs the second voice recognition on the voice in a case in which the length of the duration is equal to or less than the second threshold value.

6. The information processing device according to claim 1, wherein the acquiring unit further acquires information indicating a length of a period of time in which a same phoneme specified from the voice is continued, and
the voice recognizing unit further performs the first voice recognition on a basis of the length of the period of time in which the same phoneme is continued.

7. The information processing device according to claim 6, wherein the voice recognizing unit performs the first voice recognition on a basis of a comparison between the degree of excitement and a first threshold value and a comparison between the length of the period of time in which the same phoneme is continued and a second threshold value.

8. The information processing device according to claim 7, wherein the voice recognizing unit performs the first voice recognition or second voice recognition different from the first voice recognition on a basis of whether or not the length of the period of time in which the same phoneme is continued is larger than the second threshold value while the degree of excitement is greater than the first threshold value.

9. The information processing device according to claim 1, wherein the information indicating the degree of excitement includes a volume of the voice.

10. The information processing device according to claim 1, wherein the information indicating the degree of excitement includes information related to a difference between a feature of the voice and a feature of a voice obtained from a learning result of speech of a first user who speaks the voice.

11. The information processing device according to claim 1, wherein the information indicating the degree of excitement includes information related to a state of a second user different from a first user who speaks the voice.

12. The information processing device according to claim 1, wherein the information indicating the degree of excitement includes biometric information of a first user who speaks the voice.

13. The information processing device according to claim 1, wherein the information indicating the degree of excitement includes information related to a behavior situation of a first user who speaks the voice.

14. The information processing device according to claim 13, wherein the information related to the behavior situation of the first user includes a manipulation state of a predetermined device by the first user.

15. An information processing method, comprising:
acquiring information indicating a degree of excitement in a collection state of a voice;
performing, by a processor, first voice recognition based on a phoneme of the voice on a basis of the information indicating the degree of excitement,
wherein the first voice recognition is performed on a basis of a length of a duration in which the degree of excitement is greater than the first threshold value,
wherein the first voice recognition is performed on a basis of a comparison between the length of the duration and a second threshold value, and
wherein, in a case in which the length of the duration is greater than the second threshold value, the first voice recognition is performed based on a phoneme of a first voice corresponding to the duration among the voices on the first voice; and
performing, by the processor, second voice recognition different from the first voice recognition on a second voice other than the first voice among the voices.

16. A non-transitory computer-readable medium having embodied thereon a program, which when executed by a computer causes the computer to execute a method, the method comprising:
acquiring information indicating a degree of excitement in a collection state of a voice;
performing, by a processor, first voice recognition based on a phoneme of the voice on a basis of the information indicating the degree of excitement,
wherein the first voice recognition is performed on a basis of a length of a duration in which the degree of excitement is greater than the first threshold value,
wherein the first voice recognition is performed on a basis of a comparison between the length of the duration and a second threshold value, and
wherein, in a case in which the length of the duration is greater than the second threshold value, the first voice recognition is performed based on a phoneme of a first voice corresponding to the duration among the voices on the first voice; and
performing, by the processor, second voice recognition different from the first voice recognition on a second voice other than the first voice among the voices.

* * * * *